United States Patent Office 2,955,548
Patented Oct. 11, 1960

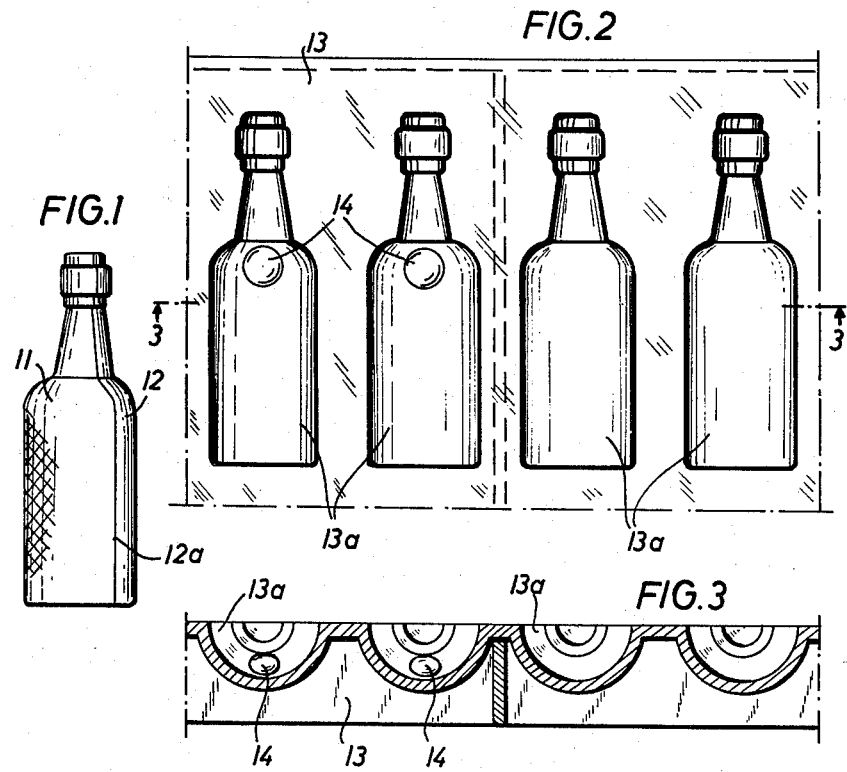

2,955,548

METHOD FOR MANUFACTURE OF LIQUID FILLED HOLLOW CHOCOLATE BODIES

Walter Himmler, Koln, Germany, assignor to Gebr. Stollwerck A.G., Koln, Germany

Filed Sept. 16, 1957, Ser. No. 684,341

Claims priority, application Germany Sept. 15, 1956

1 Claim. (Cl. 107—54)

This invention relates to a method for the manufacture of a liquid filled hollow chocolate body.

The invention primarily relates to a chocolate confection that may assume any shape or configuration desired, preferably in the form of miniature bottles and being formed of chocolate with a liquid filling, preferably liqueur.

Such hollow chocolate bodies have been produced in the form of small bottles for many years and filled with liqueur and the usual procedure in the production of such an article is to mold the article in halves of the completed hollow body in an appropriate mold and subsequently unite the halves to form a hollow closed body. It has heretofore been the practice to tap or puncture this hollow body at an appropriate place in a wall thereof and then fill the hollow body with a liquid through said tapped opening or hole and subsequently close the hole to seal in the liquid by inserting a plug of chocolate in the hole. The closing of the hole is effected in such a manner that when the liquid chocolate is applied to the hole to seal the opening, the plug of chocolate always contains more than the normal amount required to close and seal the hole of a relatively thin chocolate wall with the result that there is an outward bulge or projection at that part of the hollow body where the chocolate plug is inserted, which prevents the wrapping in tin foil or the like of the liqueur filled hollow chocolate body in standard wrapping machine as the outer end of the chocolate plug projecting outwardly of the normal exterior surface of the hollow chocolate body disrupts the tin foil and causes tearing action thereon. It has heretofore been impossible to produce an article such as described and wrapped in tin foil with the usual wrapping machine and for many years these hollow chocolate bodies filled with liqueur have been wrapped by hand and at considerable expense.

The foregoing difficulties in the production of a liquid-filled hollow chocolate body such as a miniature bottle have been overcome by this present invention and the primary object of this invention is to provide a mold for the production of a hollow chocolate body that is free of any surface projections when filled with liqueur and which has the filling opening closed by a chocolate plug so that the liquid-filled hollow chocolate body can readily pass through a standard wrapping machine without damage to the article.

A further object of the invention is to provide a mold for the production of hollow bodies from chocolate and wherein the mold has cavities with a small projection from the bottom surface of chosen cavities which results in the formation of a depression in the wall of the molded chocolate body so that when two halves of the hollow body are assembled with a depression in one half of the body, said depression can be tapped at the bottom thereof to provide a filling opening for liqueur or other liquid and the tapped opening then sealed by a chocolate plug that merely fills the depression to restore the external surface of the body to normal contour and in the absence of any projections or bulging surfaces, so that the liquid-filled hollow chocolate body may safely pass through a wrapping machine for individual wrapping without danger of damage thereto or tearing of the tin foil wrapper.

With the above and other objects in view that will become apparent as the nature of the invention is better understood, the same consists in the novel form, combination and arrangement of parts hereinafter more fully described, shown in the accompanying drawing, and claimed.

In the drawing:

Fig. 1 shows a closed hollow body formed of chocolate in the form of a bottle,

Fig. 2 is a diagrammatic plan view of a mold for forming two halves of the hollow body with projections on the bottom surface of the selected mold cavities, Fig. 3 is a cross-sectional view taken on line 3—3 of Fig. 2, Fig. 4 is a vertical sectional view of a molded hollow chocolate body showing a depression in a wall thereof formed by the projection in the mold, Fig. 5 is a vertical sectional view similar to Fig. 4, showing a tapped opening at the bottom of the depression and a tube inserted in the hole for the introduction of liquid into the body, and Fig. 6 is a vertical sectional view of the hollow chocolate body with the filling tube removed and the tapped hole closed by a chocolate plug that restores the outer surface of the hollow body to normal contour.

For the purposes of clarity the hollow chocolate body will be herein referred to as a bottle and of the miniature type, but it will be understood that the hollow chocolate body may assume any desired configuration. The hollow chocolate bottle is formed of two sections or halves 11 and 12 as shown in Figs. 1 and 4 to 6 and these sections are joined together along the lines 12a.

In the production of the hollow chocolate bottles, there is employed a form or mold 13 as diagrammatically illustrated in Figs. 2 and 3 and this mold has a series of cavities 13a therein in the form of bottles and adjacent the throat of a pair of cavities 13a there is a small bulbous projection 14 rising from the bottom surface of the mold resulting in the production of a depression 15 in the throat portion of the bottle as shown in Figs. 4 to 6. It will be understood that only selected mold cavities 13a carry the bulbous projections 14, while other cavities as illustrated in Figs. 2 and 3 are free of these projections so that a completed bottle is comprised of one half section with the projection and a second half section without the projection, again as illustrated in Figs. 4 to 6.

The chocolate bodies are manufactured in general with a small wall thickness since the chocolate serves only for holding the liquid filling. By means of the illustrated mold halves 13 body halves are manufactured from chocolate. This is effected in such a manner that the mold cavities 13a are filled with liquid chocolate. This liquid chocolate solidifies with a certain thickness of the chocolate layer adhering to the walls of the cavities 13a to a solid body half. The liquid chocolate which remains above the solidified chocolate layer is thereupon poured out from the mold cavities. Thereby, the chocolate body halves are completed and only the edges have to be made smooth. These chocolate body halves are then assembled after softening of their edges to a closed chocolate bottle according to Fig. 4.

The thickness of the wall of the chocolate body half is dependent on the solidification time of the chocolate layer abutting the inner wall of the mold cavity.

The meeting edges of the half sections of the molded bottle are united together and held by adhesion on the edges 12a as shown.

The formed bottle is shown in Fig. 4 with the depression 15 in the wall thereof and as illustrated in Fig. 5, a hole 16 has been tapped through the wall of the bottle at the bottom of the depression and a filling tube 17 inserted through this tapped hole for the introduction of fluid into the chocolate bottle of any desired character, preferably liqueur.

After the hollow bottle has been filled to the desired depth with the liquid, as illustrated in Fig. 6, the filling tube 17 is removed and the tapped hole 16 at the bottom of the depression 15 is then closed by a chocolate plug 18 and this plug is initially in a somewhat plastic state so that the body of chocolate can be manipulated to effectively seal the tapped hole and fill the depression 15 for restoring the exterior surface of the bottle to its normal contour, free of depressions and particularly free of projections or protuberances. It will be seen from an inspection of Fig. 1, which shows the completed liquid-filled hollow chocolate bottle, that the closure or filling plug 18 has lost its identity as the color of this chocolate plug merges with the color of the chocolate bottle.

A hollow chocolate bottle containing a liquid as disclosed in this application can be safely passed through a wrapping machine without damage to the wrapping tin foil or damage to itself and this wrapping which has heretofore been done for many decades by hand, can now be accomplished by machines.

While there are herein shown and described the preferred apparatus, article produced thereby and the method of producing such article, it is nevertheless to be understood that minor changes may be made therein without departing from the spirit and scope of the invention as claimed.

What is claimed is:

The method of producing a liquid-filled hollow chocolate body consisting of forming the hollow body in halves and simultaneously forming a depression in the wall of one of the halves, joining the halves to form the hollow body, tapping a hole through the wall of the body at the bottom of the depression, introducing liquid through the hole into the hollow body and closing the hole and filling the depression with a chocolate body to restore the outer surface of the body to normal contour in the absence of projections.

References Cited in the file of this patent

UNITED STATES PATENTS

| | | |
|---|---|---|
| 325,711 | Stuckes | Sept. 8, 1885 |
| 943,945 | Liebich | Dec. 21, 1909 |
| 1,231,286 | Newcomb | June 26, 1917 |
| 1,567,284 | Miller | Dec. 29, 1925 |
| 2,298,644 | Hummel | Oct. 13, 1942 |
| 2,585,000 | Friddell | Feb. 12, 1952 |
| 2,593,543 | Curioni | Apr. 22, 1952 |
| 2,796,033 | Feinstein | June 18, 1957 |

FOREIGN PATENTS

| | | |
|---|---|---|
| 70,061 | Denmark | Oct. 10, 1949 |
| 101,035 | Austria | Sept. 25, 1925 |
| 500,980 | Belgium | Feb. 15, 1951 |